United States Patent [19]
Seeds

[11] Patent Number: 5,206,046
[45] Date of Patent: Apr. 27, 1993

[54] FRIED FLAVOR ROUX BASE AND METHOD FOR PRODUCTION

[76] Inventor: W. R. Seeds, 208 Oldham Ave., Waxahachie, Tex. 75165

[21] Appl. No.: 918,969

[22] Filed: Jul. 24, 1992

Related U.S. Application Data

[63] Continuation-in-part of Ser. No. 613,253, Nov. 14, 1990, Pat. No. 5,145,705.

[51] Int. Cl.⁵ .............................................. A23L 1/39
[52] U.S. Cl. ..................................... 426/589; 426/99; 426/578; 426/618; 426/622
[58] Field of Search ................ 426/589, 99, 578, 618, 426/622

[56] References Cited

U.S. PATENT DOCUMENTS

| | | | |
|---|---|---|---|
| 4,126,710 | 11/1978 | Jaworski et al. | 426/589 |
| 4,363,824 | 12/1982 | Willi et al. | 426/589 |
| 4,415,599 | 11/1983 | Bos | 426/578 |
| 4,492,713 | 1/1985 | Chauvin | 426/231 |
| 4,568,551 | 2/1986 | Seewi et al. | 426/99 |
| 4,844,938 | 7/1989 | Amamoto et al. | 426/589 |

Primary Examiner—Jeanette Hunter
Assistant Examiner—Mary S. Mims
Attorney, Agent, or Firm—Henry Croskell

[57] ABSTRACT

A fried flavor roux base is provided by cooking a starch such as grain flour and the like with fats and oils under controlled conditions for producing roux having definitive fried taste as can be correlated by the color of the roux. The fried flavor roux base can consist of a dry mix which can be directly added to hot water or other hot fluids to form a gravy or sauce substantially free of lumps or can be applied to other food products in the form of breadings, stuffings and the like. The roux base can effectively be produced having fried flavor wherein the flavor intensity can be adjusted through the process steps of heating, timing and quenching.

28 Claims, 3 Drawing Sheets

FRIED FLAVOR ROUX BASE AND METHOD FOR PRODUCTION

This application is a continuation-in-part application of U.S. Ser. No. 07/613,253, filed Nov. 14, 1990, now U.S. Pat. No. 5,145,705.

FIELD OF THE INVENTION

The present invention generally relates to a method for producing a fried flavor roux obtained by cooking a starch such as grain flour with fats and oils or more specifically, shortening under controlled conditions for producing roux having definitive fried taste as can be correlated by the color of the roux.

In another aspect, the invention relates to a dry mix roux base which may be added directly to hot water or other hot fluids to form a gravy or sauce substantially free of lumps. In yet another aspect the invention relates to a fried flavor roux base that has application in food products other than gravies and sauces such as breadings, stuffings and the like.

BACKGROUND OF THE INVENTION

Presently, there are various known methods for producing roux. For example, U.S. Pat. No. 4,844,938 discloses a method for producing roux by drying flour until the moisture thereof is reduced to 0.5 to 10% by weight, adding fats and oil having a melting point of not more than 55° C. and a weight ratio of flour/fats and oils being of 1/5 to 1/0.25 then heating the mixture at a temperature of 65° to 130° C. for five to sixty minutes. The patent further teaches heating a similar mix in a two cycled heating process after the first cycle cooling and seasoning with processed milk products, extracts, starch and the like of from 0.3 to 4 parts by weight relative to one part by weight of total amount of mixture of dried flour and fats and oils and subjecting the result of mixture to a second heating and mixing process. A primary object of the reference is to provide a method for producing roux which makes it possible to eliminate the problems of powdery or grainy texture and raw material odor. Several of the prior art teachings provide methods for producing roux however, the roux has odor of raw materials since the ingredients are not heat treated at elevated temperatures. Moreover, such roux has a problem that it turns pasty when cooked.

In addition, U.S. Pat. No. 4,363,824 which addresses a process for the production of a food base instantaneously dispersible in water also presents as an object to provide a suitable heat treatment combined with a suitable choice of starting materials as a method for producing an instantaneously dispersible water roux or food base. The reference further addresses the issue that the required properties of roux cannot be obtained by temperature cycles. Although as normally assumed that it is only the temperature levels at which the fat is held and the holding times which are important in the heat treatments of fats, it has been found that controlled cooling is also crucial. The reference addresses a food base with a requirement of a binding effect without forming lumps when boiling water is poured onto the food base. In addition, the food base or roux is required to be storageable and not to agglutinate at room temperature.

Dry mixture compositions, which typically contain thickening agents such as starch or flour together with flavoring and coloring agents are widely used to prepare gravies and sauces. In preparing a roux from such a mix, the dry mix is dispersed in cold water and the dispersion gradually heated to boiling with constant agitation to gelatinize the starch and thereby thicken the liquid to the desired extent. This process must be carried out with care in order to avoid the formation of lumps in the thickened product. A number of procedures have been suggested in order to avoid the formation of lumps in the prepared gravies and sauces using a dry mix composition. For example, U.S. Pat. No. 4,415,599 provides an improved dry mix composition for the preparation of gravies and sauces which contains a thickening agent, such as starch and/or flour, and maltodextrin, with the maltodextrin being present in the dry mix composition in an amount sufficient to provide a weight ratio of maltodextrin to thickening agent of at least 1:1.

A roux is a basic cooking ingredient used especially in French and Creole cooking as well as in Continental and Italian cooking and more recently, heavily relied upon by various fast food preparations. Roux is used for example, as a base for making gravies, soups, sauces, etc. In general, roux is made by cooking a mixture of flour and vegetable oil or other fat based substance until the desired cooked brown mixture is reached. In classical French cooking, the roux is made by mixing flour with melted butter. Various cookbook authorities define roux similarly for example, a generic term for various flour bindings. A roux is sometimes brown, sometimes white, according to the end use intended. If a thin sauce or gravy is required then, the amount of flour to oil is reduced. The color of the roux is gently brought to the desired shade by heating and stirring then the liquid ingredient by the recipe is added little by little and the sauce seasoned as desired and allowed to mellow. The drippings from a piece of roast meat is sometimes used instead of butter or cooking oils and fats thus, improving the flavor of the sauce if intended to be served with the roast.

Because fat is known to provide improved flavor consistency and mouth feel to foods, its use in certain food applications is highly desirable. For obvious reasons, concentrations containing a substantial proportion of fat or oil are generally not prepared in dry form. Advantageously, such concentrates are provided in tub configurations or the like similar to margarines. Although fat-containing concentrates in these forms provide a number of benefits in terms of convenience, stability and the like, their preparation generally involves expensive equipment and procedures. Heated mixtures of flour and fat used as thickeners in gravies and as sauce bases and the like are known as roux. Flour and fat are combined in suitable proportions and amounts and heated for varying periods depending upon the type of roux desired. Preparation of conventional roux is time consuming and considerable care must be taken to avoid overheating and to achieve a smooth consistency.

The teachings of the prior art are generally concerned with methods for producing roux, gravies and sauces having smooth consistency being lump free when added to water or other cooking fluids. In addition, roux is prepared with various additives and flavorings in order to achieve end product gravies and sauces having desired taste and texture. However, none of the methods described provides roux or roux base having a fried flavor as a result of the method of preparation. In fact, many of the references are concerned in avoiding the odor of the raw materials as well as the pasty texture and appearance of roux preparation processes. Further, most roux preparations are made at lower temperatures when combining the starch and flour base materials with the oils in order to avoid certain burn, or other taste characteristics.

It can be seen that for improved convenience, especially in the fast food industry, a hot or boiling water dispersible fried flavor roux base product for gravies, sauces and soups is desirable so that the food prepared does not have to follow cumbersome cooking procedures or use costly additives or flavor essence which can vary substantially from mix to mix. It is also highly advantageous to have a roux base product with definitive flavor which is suitable for use in soups and sauces and gravies while being storage stable and simple to integrate into food preparation. It would be most beneficial to the end user if such a fried flavor roux base product having consistent flavor and roux properties could be made and supplied in dry bulk; however, vegetable oil will produce a liquid form end product. In this invention, a fried flavor roux base product for gravies and sauces which has the above described advantages is provided through the use of the process described herein.

SUMMARY OF THE INVENTION

Under such circumstances, it is industrially important to develop a new and improved method for producing roux and supplying a roux base having fried flavor from the viewpoint of enhancing the commercial use of such roux having a definitive flavor.

Accordingly, it is an objective of the present invention to provide a method for preparing fried flavor roux base wherein the flavor is directly in correlation with the color of the produced roux base.

It is another object of the present invention to provide a fried flavor roux base composition wherein the flavor essence of the roux base is identifiable by color tone and yet the roux base is capable of providing sauces and gravies which are pleasant to the palate with definitive fried flavor.

The present invention has been completed on the basis of the finding that the aforementioned problems associated with the conventional methods for production of roux and the roux base product can effectively be solved by producing a roux base having fried flavor which adjusts the flavor intensity through a combination of heating, timing and quenching. The heating of a mixture of predried flour or equivalent product with a liquified shortening wherein the mixture has a ratio of from about 75:25 to about 25:75 percent by weight of flour to shortening. During heating, the mixture is continuously stirred for a period of about two minutes up to about sixty minutes while the temperature of the mixture is being elevated through various stages of caramelization, producing corresponding color changes. These color changes occur more rapidly as the temperature of the mixture increases. At the appropriate temperature and time combination the caramelizing mixture is quenched in order to halt the caramelization reaction resulting in a particular roux base product having a fried flavor which is correlated to the roux base color.

In the development of fried flavor roux base products, and the resulting gravies and sauces produced by application of these products, especially in microwave applications, it is necessary to have specific flavors prior to microwave preparation. In public food preparation services as well as in the home, the need for uniform consistent products that do not vary batch to batch is paramount. Especially if the roux base product is prepared with a specific flavor essence or taste. According to the invention, the individual fried flavor roux based products can be produced with varying taste by variation of the time and temperature of the process thus, providing different flavor profiles for a specific flour-shortening combination. Roux base according to the invention can be the result of two or more different production cycles which can be blended to develop a roux base product of a specific flavor or the process can be set out to develop a definitive flavor which is identifiable by the roux base color.

The present invention deals with the food chemistry of roux base preparations through the caramelization of flour in shortening to achieve a roux base which provides a specific fried flavor. In fast food chains such as Kentucky Fried Chicken, Grandy's and the like, gravies play a significant role in day to day food service. The present invention provides a method and product which is suitable for providing gravies with fried taste however, avoiding the necessity of preparing these gravies from scratch in the restaurant. Thus, the present invention provides a one step gravy or sauce mix in which the desired gravy or sauce may be prepared by the addition of the fried flavor roux base dry mix directly to boiling water.

DETAILED DESCRIPTION OF THE INVENTION

In accordance with the present invention, correlation of taste and color of the fried flavor roux base was discovered that allows a process and product having consistent taste. Since taste is something that is not physically measured by instrumentation and varies from palate to palate, the discovery of the food chemistry process of reaching a specified appropriate flavor as correlated to color code presents a significant advancement of the food chemistry and institutional food preparation services. The roux base in accordance with the invention is comprised of a mixture of flour and fats or shortenings. Namely, wheat flour and an animal or vegetable fat or a blend is provided with the mixture of flour to fat ratio being variable from weight relationships of about 3:1 to about 1:3. A dry flour is mixed with the liquified shortening or oil or in the alternative, the mixture is preheated to 250° F. to drive off moisture that would be present in the flour and the mixture. The mixture is then heated to a temperature for a specific time period that corresponds to the desired flavor-color. The time requirement can vary depending upon the temperature range and the specific components. In general, the time will vary from about two minutes to about sixty minutes and more specifically, from about two minutes to about thirty minutes. The temperature can range from about 250° F. to about 475° F. again, depending on the nature of the oil and the flour or starch mixtures. The variation of time and temperature are viable and can be changed if the process is per-formed under pressure. The product that is produced is quenched in order to stop the caramelizing food chemistry reaction at the appropriate color-flavor determination. The quenching is accomplished by heat exchanger means and such quenching means can be tailored in order to allow the end product to be formed into pellets or thin flakes or in the case of vegetable oil, a fluid product. The product produced The product produced in this physical format, i.e., a dry format, allows for easy dispersion of the fried flavor roux base into a fluid comprised of water, milk or other cooking fluid materials to form a gravy mix or sauce. In addition, the roux base can be mixed into breading crumb and stuffing materials can be premixed as a combination package available for the end user or mixed by the user with customary bread crumbing and stuffing materials. In addition, the roux base can be mixed with typical packaged seasoning and breading products whether in particulate or dust form applications for use in microwave or conventional oven food preparation.

According to one embodiment of the invention, a predried flour is mixed on a one to one weight basis with soybean oil which is hydrogenated with constant mixing and heating conditions. The mixture reaches a specific fried flavor and color band when elevated to about 400° F. When the temperature of about 400° F. is reached, the caramelizing flour soy oil product must be quickly quenched in order to stop the food chemistry caramelization reaction. Other oils, such as peanut oil, corn oil and the like will give different flavors under different conditions however, the flavors are also color related.

The fat that is used can be either animal or vegetable or a blend of both and can have a different level of saturation depending on the application for which the flavor component is desired. Fats of lower saturation will have less stability than those with more saturation. Antioxidant can be used to protect the fat from rancidity and would be added after heating but before final cooling. Variation of the saturation and fat type also enables the roux base to have a variety of melt characteristics and impact the release of flavor. Roux based produced products that are eaten at room temperature will require a fat that has a low saturation so that a waxy taste is not evident. A roux base of this type would be used as a component such as a dust or seasoning for snacks. Roux bases that are subjected to heating applications can be produced with higher melt fats.

The drying of flour or flour materials or mixtures may be effected according to any method such as hot air drying, drying under reduced pressure and the like. However, it is recommended to use a hot air drying technique in particular, an air flow drying technique which permits the immediate reduction of moisture content of the flour and which scarcely causes lowering of quality such as by scorching or generation of an odor due to deterioration. The hot air drying can be carried out at temperatures of 150° F. to 300° F. for two seconds to ten minutes or longer. The reason why the wheat flours and other flour materials are dried is to reduce the moisture content thereof to a specific level prior to admixing the flour with the fats, oils, i.e., shortenings. The moisture content is reduced to a level lower than that required to cause swelling of the starch in the flour, thus, the swelling thereof is suppressed. Moreover, the flour shrinks due to the drying and thus, the surface area thereof is reduced which leads to an increase in the amount of fats and oils present between the flour particles and capacity for serving as a lubricating oil. For these reasons, it becomes possible to suppress the increase in viscosity during admixing the flour with fats and oils. Because of the low moisture content of the flour, the temperature of the flour per se is rapidly raised during heating and mixing with the fats and oils, which enables effective heat treatment thereof. At the same time, the rapid rise of temperature of the flour makes it possible to solve the problem of powdery or grainy texture in appearance and generation of raw material odor in the roux base.

Various flours, usually together with a certain amount of various starches, may be used as the flour material. It is possible to use wheat flour, rice flour and the like depending on the end product envisioned and the type of shortening used as well as the flavor desired. In the practical application of the process according to the invention, the flour material, optionally as separately prepared premix of flour starch or blend of flours may be added to the moltant fat or shortening.

In the first step of the process for producing the fried flavor roux base according to the invention, a shortening, preferably a vegetable oil type shortening is heated to a moltant condition and then the dried flour is added to the moltant shortening. In another embodiment, the flour source can be added to the moltant shortening and brought up to 200° to 250° for purposes of driving off any moisture in the flour or shortening. During the preheating of the flour and shortening for drying purposes the mixture is continuously agitated and mixed as well as during the heating for caramelization purposes which result in the roux base. Once the mixture is heated for a sufficient time and at a desired temperature to achieve a definitive color, the mixture is immediately quenched in order to abort the food chemistry reactions of caramelization and thus, preserve the desired flavor as indicated by color. Depending on the quench means by which the mixture is immediately cooled, flakes can be formed wherein the mix is applied either to a cooling roller or to a cooling belt from which the flakes are scraped.

The method for producing the roux base in accordance with the invention can include both batch and continuous means. The batch means includes a general pot approach of mixing and heating of the mixture under controlled conditions of temperature and time and equally important, controlled agitation in connection with the bottom areas of the container. The mixture requires agitation to reduce to a minimum the contact of the mixture ingredients with the bottom and sides of the container in order to avoid scorching exposure of the mixture at substantially elevated temperature. Production of the roux base in a continuous phase can be achieved through heated extruder means wherein the mixture is subjected to vigorous energized mixing and elevated temperatures under controlled conditions with the mixture being continuously fed to the heated extruder chamber and continuously removed therefrom to an immediate quenching zone.

Although final cooking of the mixture may be affected by any suitable means known in the art, the mixture may be quick chilled or quenched by pumping through a heat transfer means such as a scraped surface heat exchange apparatus to start crystallization of fat. Depending on the type of fat used, the cooled roux base assumes a somewhat plastic configuration and may be formed into flakes and/or granular like configurations. Cooling or quenching of the flowable mixture by pumping it through a heat transfer apparatus provides the advantage over certain prior art processes of continuous processing with attended economics and efficiency in energy expenditures.

In order to more clearly describe the nature of the present invention, specific examples will hereinafter be described. It should be understood however, that this is done solely by way of example and is intended neither to delineate the scope of the invention or limit the ambient of the appended claims. In the examples and throughout the Specification, percentages referred to % by weight and are based on the weight of the final product unless otherwise specified.

EXAMPLE I

This example illustrates one embodiment of the present process and the fried flavor roux base produced thereby.

The process begins with two main raw ingredients. An all purpose enriched bleached wheat flour generally described as a standard hotel and restaurant wheat flour blend, a blend of both hard and soft wheat and the ingredients are bleached wheat flour, malted barley flour and vitamin enrichments niacin, iron thiamin, mononitrate, and riboflavin is used as the flour ingredient. In one embodiment a partially hydrogenated soy bean oil more specifically described as 100% soy bean oil that is superhydrogenated so that the resulting shortening contains a minimum of 65% solids and the melting point of the resulting shortening is 112° F. or higher constitutes the second ingredient. Even though the resulting shortening is very stable, it is anticipated that antioxidants will be incorporated in the process at a level of approximately 200 ppm.

The two ingredients are measured out in for example, equal amounts by weight. The mixture was prepared using 500 grams of each ingredient for a total finished product of 1,000 grams. First, the shortening component was placed in a heavy gauge cooking vessel approximately 10.5 inches in diameter and 2 inches deep. The shortening was then melted and brought to a temperature of 200° F. by placing the cooking vessel on a standard stovetop burner on a medium heat setting. The flour was then incorporated with the shortening and thoroughly mixed until no lumps of flour remain. The mixing was done with an electric hand-held single beater mixer attached to a special springlike wire mixing and scraping attachment. When the two ingredients were thoroughly mixed, the temperature was raised to a high setting and achieved approximately 400° F. The mixture was cooked at the 400° F. while constantly being mixed and the vessel being scraped with the springlike wire mixing and scraping attachment. The cooking extended through twenty minutes of cooking and agitating with the mixture going through various stages of caramelization. In other words, the visible appearance of the cooking product changed from an off-white in the beginning through many shades of reddish-browns. Furthermore, during the cooking process the color changes occurred at more rapid rates as the temperature of the product was elevated. By the time the product reached 400° F. the product was reacting and changing very rapidly for example, changing from a slightly thick texture to a very thick texture (similar to the appearance of melted chocolate). About 25 minutes into the process, the reaction was halted in order to arrive at the proper useful color which in turn, provided a particular fried flavor. As soon as the product reached a PMS color of 4625C using the Pantone 747xr color matching system, the mixture was immediately cooled to 200° F. which stopped the majority of the in progress reaction and preserved the proper color which in turn, preserved the proper fried flavor.

Prior to beginning of the cook, a cooling vessel was prepared that consisted of a rectangular corning ware baking dish of 12"×7.5"×2". The corning ware dish was placed in another metal baking pan 13"×9"×2" which was 75% filled with ice and water. The cooking reaction product was immediately removed from the stovetop and hastily poured into the cooling vessel which was at approximately 30° F. The product was agitated and mixed during the cooling cycle until the product reached a temperature of 200° F. The product was then allowed to rest until a temperature of 150° F. was achieved at which time, the product was again agitated and mixed back to a homogenous state. During the cooling period the oil has a tendency to separate from the now caramelized flour. As soon as the product temperature fell below the melting point of the shortening at approximately 112° F. the product solidified and then could be shaped into various sizes for use in a finished product requiring a fried flavor roux base.

EXAMPLE II

Flour having a moisture content of 14% was mixed with liquid hydrogenated soy bean oil at a temperature of 150° F. The mixture which is mixed with continuous agitation was further heated to 250° to remove the moisture. The low moisture mixture was then additionally heated to develop the specific color-flavor desired. Equal amounts of flour and oil by weight were mixed together and once the desired color was obtained, the product was quenched.

In 1964 color standards were adopted which factored various commercial judgements and standard observer evaluations which gave more weight to the shorter wavelengths of color and are believed to more adequately represent the object-color response function of human observers. Because these proposed scales did not provide even reasonably uniform estimates of perceived color intervals of color and relationships, scientists have developed a number of so-called uniform color scales. Most although not all, of these are opponent-colors (L,a,b-type) scales, based on the opponent-colors theory of color vision. The opponent-colors theory presumes that, in the human eye, there is an intermediate signal-switching stage between the light receptors in the retina and the optic nerve taking color signals to the brain. In this switching stage, red responses are compared with green to generate a red-to-green color dimension. The green (or red and green together, depending on the theory used), response is compared in a similar manner with the blue to generate a yellow-to-blue color dimension. These two dimensions are widely, though not always, associated with the symbols a and b, respectively. The necessary third dimension, L for lightness, is a nonlinear function such as the square or cube root of Y, which is percent reflectance (or transmittance).

The scientific validity of the opponent-colors system is strongly supported by experimental evidence. The wide acceptance and use of the system by practicing color technologists supports its validity and thus is the reason that such a theory and system is utilized in recording the various product colors produced by the present invention.

Based on a comparison of Hunter Lab. Color Standard #LS-12695 dated May 1989, (hereby incorporated by reference), flavor of the produced roux base was directly related to time/temperature of the mixture using a Hunter color measurement "L" as a measurement of lightness. Table I illustrates the increase in product color from light tan to dark brown which are all suitable as fried flavor product in accordance with the invention.

TABLE I

| Sample | Time | Temp | L | a | b |
|---|---|---|---|---|---|
| 1 | 13.0 | 400 | 72.5 | 5.33 | 18.99 |
| 2 | 13.5 | 415 | 62.85 | 6.15 | 18.03 |
| 3 | 14.0 | 425 | 62.79 | 7.43 | 19.42 |
| 4 | 14.5 | 425 | 48.20 | 9.57 | 16.88 |
| 5 | 15.0 | 430 | 43.80 | 8.64 | 14.64 |
| 6 | 15.5 | 430 | 41.29 | 8.14 | 13.31 |
| 7 | 16.0 | 430 | 40.65 | 8.37 | 13.49 |
| 8 | 16.5 | 430 | 36.23 | 8.80 | 12.57 |
| 9 | 17.0 | 430 | 35.28 | 8.76 | 12.35 |
| 10 | 17.5 | 430 | 34.99 | 8.39 | 11.84 |
| 11 | 18.0 | 435 | 32.78 | 8.31 | 11.24 |
| 12 | 18.5 | 435 | 34.53 | 9.47 | 12.50 |
| 13 | 19.0 | 435 | 33.63 | 7.23 | 11.33 |
| 14 | 19.5 | 435 | 32.64 | 7.36 | 11.01 |
| 15 | 20.0 | 435 | 30.08 | 5.83 | 8.51 |
| 16 | 20.5 | 435 | 27.74 | 6.68 | 8.87 |

Product lightness "L" decreases as product is heated and becomes more caramelized. Flavor profile becomes stronger which allows less component to be used in producing the various food products according to the invention. It also is possible to blend several different product components together and obtain separate flavor essence. Variation in fat component results in a change in the final product. Product that is produced with a fat that is solid at room temperature produces a final product that can be flaked. Product that is produced with a fat that is liquid at room temperature results in a final product that has a plastic or fluid type consistency. Each product has areas for application that are different depending on the physical characteristics which are desired by the end user. The data illustrated in Table I provides color readings for various products in accordance with the invention based on a comparison to Hunter Lab. color standard #LS-12695 dated May 1989, wherein L would range from about 20 to about 75; a from about 5 to about 10; and b from about 6 to about 20.

Examples III through X are presented below with various modifications such as additives and time/temperature variations. Materials used in Examples III through X are as follows: enriched wheat flour; partially hydrogenated soybean oil from Bunge foods; partially hydrogenated soybean oil from Anderson Clayton/Humko Products, Inc.; glucose from Staley; Myvaplex 600 glycerol monostearate from Eastman; and myverol 18-06 distilled monoglycerides from Eastman. The equipment utilized was a cast iron skillet, a Black & Decker hand mixer/beater with spiral whisks, digital temperature indicator, linear recorder with variable input, Hunter Lab colorimeter, peetry dishes, thongs, gloves, and an electric stove.

The procedure provided the partially hydrogenated soybean oil to a hot skillet wherein oil was allowed to liquify. Wheat flour to which glucose and emulsifiers had been added was mixed in with vigorous stirring. The mixture was heated under medium-high heat with continuous stirring until its color was slightly darker than the color of a control previously prepared. The slurry was immediately transferred to a cooled glass tray which was submerged in ice water. Continuous stirring was provided.

Eight different products were made as follows:

EXAMPLE III

CONTROL A: Flour (500 g)+oil-BUNGE (500 g).

EXAMPLE IV

CONTROL B: Flour (500 g)+oil-HUMKO (500 g).

EXAMPLE V

2% MYVEROL 18-06: Flour (490 g)+oil-HUMKO (490 g)+Myverol 18-06 (20 g).

EXAMPLE VI

2% MYVAPLEX 600: Flour (490 g)+oil-HIMKO (490 g) Myvaplex 600 (20 g).

EXAMPLE VII

1% GLUCOSE: Flour (495 g)+oil-HUMKO (495 g)+glucose (10 g).

EXAMPLE VIII

Same as V but the mixture was held at 140° C. to develop more flavor.

EXAMPLE IX 0.5% GLUCOSE: Flour (497 g)+oil-HUMKO (497 g)+glucose (5 g).

EXAMPLE X

Same as VI but reaction was allowed to proceed until dark roux was obtained.

The Hunter L, a and b values of Examples III through X are provided in the following tables which are labeled respectively Examples III through X. Hunter L value denotes "lightness", i.e., the lighter the color, the higher the L value. The Hunter a value denotes redness (a high a value) or greeness (a low a value). The Hunter b value measures yellowness (high b value or blueness) (low b value).

EXAMPLE III

| | Temp (°C.) | L | a | b |
|---|---|---|---|---|
| | 100° C. | 61.14 | −0.11 | 14.90 |
| | 120° C. | 64.66 | −0.19 | |
| | 140° C. | 60.72 | 0.14 | 16.13 |
| | 160° C. | 62.24 | .85 | 17.91 |
| | 175° C. | 53.10 | 2.9 | 18.0 |
| | 180° C. | 52.0 | 5.8 | 19.8 |
| | 200° C. | 41.3 | 8.5 | 18.1 |
| Cooling | 75° C. | 28.7 | 9.5 | 15.6 |

EXAMPLE IV

| Time (min.) | Temp (°C.) | L | a | b |
|---|---|---|---|---|
| 2:57 | 130° C. | 59.32 | 0.61 | 14.84 |
| 3:00 | 150° C. | 60.37 | 0.51 | 16.9 |
| 3:01 | 170° C. | 58.21 | 3.35 | 18.8 |
| 3:04 | 180° C. | 43.25 | 6.50 | 18.20 |
| | | | | Transferred to ice water |
| 3:12 | 80° C. | 36.63 | 9.0 | 10.16 |

EXAMPLE V

| Time (min.) | Temp (°C.) | L | a | b |
| --- | --- | --- | --- | --- |
| 3:32 | 130° C. | 61.43 | −.27 | 15.26 |
| 3:36 | 150° C. | 62.84 | −.18 | 16.00 |
| 3:40 | 170° C. | 52.5 | 7.2 | 18.2 |
| 3:41 | 180° C. | 52.8 | 3.0 | 19.0 |
| 3:43 | 200° C. | 38.0 | 7.0 | 17.0 |
| 3:58 | 30° C. | 32.1 | 9.0 | 16.0 |

EXAMPLE VI

| Time (min.) | Temp (°C.) | L | a | b |
| --- | --- | --- | --- | --- |
| 4:14 | 120° C. | 56 | −0.13 | 16 |
| 4:20 | 150° C. | 35 | −0.10 | 17 |
|  | 175° C. | 53 | 2.0 | 17.5 |
| 4:25 | 195° C. | 55 | 5.0 | 2.0 |
| 4:40 | 35° C. | 34 | 9.0 | 17.7 |

EXAMPLE VII

|  | Time (min.) | Temp (°C.) | L | a |
| --- | --- | --- | --- | --- |
|  | 8:13 | 100° C. | 5.75 | 0.86 |
|  |  | 130° C. | 5.30 | 6.91 |
|  | 8:70 | 150° C. | 4.09 | 9.25 |
| Cooling | 8:25 | 105° C. | 3.58 | 9.73 |
|  | 8:36 | 30° C. | 3.49 | 10.9 |

EXAMPLE VIII

|  | Time (min.) | Temp (°C.) | L | a |
| --- | --- | --- | --- | --- |
|  | 8:47 | 100° C. | 62.4 | 1.33 |
|  | 9:04 | 130° C. | 52.9 | 6.91 |
|  | 9:08 | 150° C. | 37.9 | 9.79 |
| Cooling | 9:18 | 45° C. | 31.3 | 10.8 |

EXAMPLE IX

| Time (min.) | Temp (°C.) | L | a |
| --- | --- | --- | --- |
| 9:40 | 100° C. | 56.6 | 1.35 |
| 9:45 | 130° C. | 60.0 | 2.10 |
| 9:48 | 145° C. | 51.0 | 7.73 |
| 10:03 | 67° C. | 36.1 | 14.1 |

EXAMPLE X

| Time (min.) | Temp (°C.) | L | a | b |
| --- | --- | --- | --- | --- |
| 10:21 | 100° C. | 58.9 | −0.48 | 19.6 |
| 10:28 | 130° C. | 57.1 | 1.2 | 17.3 |
| 10:33 | 150° C. | 40.6 | 8.1 | 17.8 |
| 10:37 | 170° C. | 36.0 | 9.0 | 17.0 |
| 10:43 | 190° C. | 26.7 | 9.4 | 14.0 |
| 10:50 | 44° C. | 16.6 | 9.0 | 9.8 |

Addressing Examples III through VIII and the results produced thereby, in Example III the result was darker than desired but would be suitable in dilute concentration in accordance with the invention. However, burned product would not be in accordance with the invention. The result of Example IV started thickening at 180° C. and an appropriate color was achieved. The mixture of Example V was taken to 200° C. as opposed to 180° C. before the mixture was removed for quenching. Noticeable streaked blooming was found in the final product. The same type of streak blooming was found in the final product of Example VI wherein the temperature of 200° C. was reached before transfer to quenching. The results of Example VII were achieved by quenching after reaching a temperature of 155° C. with a smooth product which had a sweet taste. The product of Example VIII was held at 140° C. to develop additional flavor and was quenched after reaching 150° C. The product of Example IX was taken up to 145° C. before quenching and achieved a suitable result. The mixture in Example X was elevated to 190° C. however, a dark roux resulted which was marginally acceptable.

EXAMPLE XI

A mixture of BUNGE shortening and flour (68 lbs. shortening and 86 lbs. flour) was heated in a steam-jacketed kettle to 250° F. (121° C.). The mixture was pumped manually at an estimated rate of 21 pounds per hour through a votator held at a temperature of 436° F. (225° C.). The votator has one square foot of heat exchange area. Hunter L, a and b values for the product collected at the exit of the votator were 39.8, 10.3 and 19.5, respectively. When the rate was reduced to approximately 1/5 (4 lbs. per hour) the Hunter L, a and b values were 25.7, 11.7 and 14.5, respectively.

Figure 1:
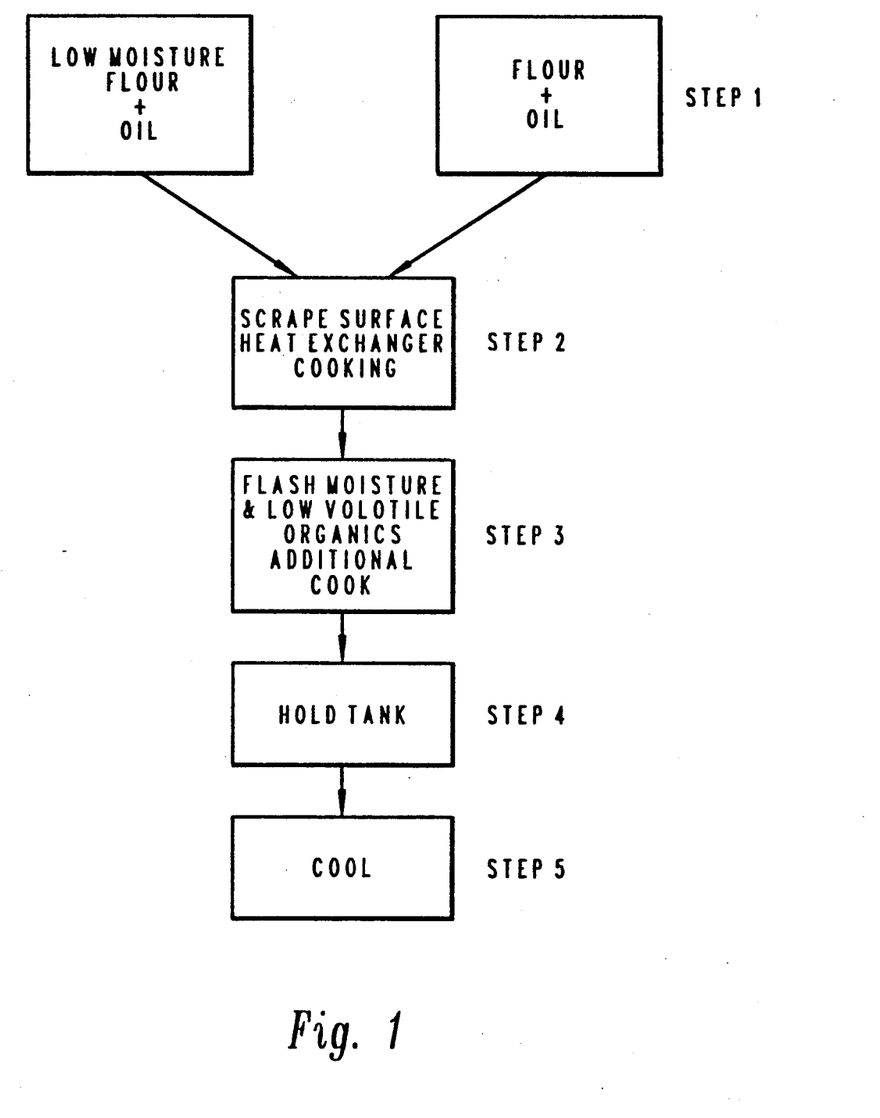
FIG. 1 illustrates a simple box diagram flow of a process in accordance with the invention wherein five major process steps are presented.

The process according to the invention for caramelization of a starch or sugars or any other materials which can be caramelized as a result of temperature elevation is accomplished according to the process as illustrated in FIG. 1. While the process as illustrated in FIG. 1 can be varied, a preheat mixture, for example, 50% starch and 50% vegetable oil by weight, with most of the moisture removed from the starch is pumped into and through a cooking scrap surface heat exchanger (SSHE) for caramelization of the starch to a specific color (step 2). The heated and caramelized starch having a specific color is then moved to a flash system wherein the mixture under atmospheric conditions or even vacuum conditions is flashed of moisture and low volatile organic materials (step 3). The flash mixture is then moved through a cooling SSHE identified in FIG. 1 (step 4). The partially cooled mixture is then moved to a cooling system or chilling system as for example a cooling conveyor belt (step 5). The process as illustrated in FIG. 1 can be batch or continuous but is preferably a continuous process wherein the heated mixture is maintained at a temperature above the crystallization temperature of the mixture during the processing in order that the mixture can be moved between the process steps by pump means. The mixture which approaches a solid but still flowable is pumped out of the cooling SSHE onto a conveyor belt, for example in step 5. The conveyor belt is located in a cold room held at about 25° F. which causes the mixture to harden into small pellets which are then weighed, stored and packaged.

Production of Fried Flavor Roux Base

Step 1

A blend of flour and oil at about a 1:1 ratio is heated at about 230° F. for 2 hours to reduce the moisture that is present in the blend to below 1% by weight. Heating is accomplished in a steam jacketed kettle equipped with agitation. Heating could be accomplished by a variety of methods which allow for rapid and effective heat transfer to the oil/flour mixture. Heating within a closed system results in pockets of steam forming and reduces heat transfer due to the oil not contacting all surfaces. A series of closed heating loops which allow this moisture to be flashed off and increase the heat transfer ability of the blend oil is an effective method of moisture reduction. Blend moisture should be as low as possible prior to Step 2.

Use of a low moisture flour blended with the oil reduces the time needed to obtain a blend which is suitable for Step 2. If Step 1 heating occurs under pressure, water that is bound within the starch granule will be released and increase the heating efficiency in Step 2 and thus decrease process dwell time.

Step 2

The homogenous mixture from Step 1 with a moisture level of less than about 0.5% by weight is pumped into a modified Scrape Surface Heat Exchanger (SSHE) designed to handle process temperatures up to 600° F. Heating is accomplished using a hot oil circulating system. The mixture is fed into the SSHE by a positive displacement pump at a rate between about 0.25 and 2.50 gallons per minute. The SSHE is heated to a temperature between 350°-520° F. Process flow rate and dwell time control mixture heating and caramelization level.

Step 3

The heated mixture is exposed to atmospheric pressure by allowing the product to flow across a flat surface that controls the thickness from between about 1/16" to 1/8". Fast moving air across this thin film allows for efficient removal of the remaining moisture and certain organic compounds made up mainly of aldehydes and ketones that when allowed to remain within the product contribute to off flavor. The mixture which has been stripped of moisture and off flavor components is allowed to accumulate in an insulated, agitated tank where caramelization continues until the desired color is obtained.

Step 4

Mixture that has reached the desired color is cooled by pumping product into a second SSHE or other suitable heat transfer equipment that can reduce the temperature to between 100°-120° F. in less than 2 minutes. Cooling temperature is maintained above the crystallization point of the fat used to insure suitable flow through the final part of the process.

Step 5

The mixture is pumped to a cooling apparatus such as chill rolls, tempering tunnel or spray system that produces product below the melt point of the mixture.

Flavor of the mixture is maintained when the following variables are controlled:
A. Rate of flow through the system.
B. Temperature of the hot oil circulating system.
C. Dwell time in the flash tank.

TABLE II

| Sample | Step 3 (Temp) | Step 4 (Temp) | L Color |
|---|---|---|---|
| Test 1 | | | |
| 1 | — | — | 71.27 |
| 2 | 281° F. | 304° F. | 64.44 |
| 3 | 292° F. | 319° F. | 62.86 |
| 4 | 319° F. | 360° F. | 61.02 |
| 5 | 326° F. | 369° F. | 59.60 |
| 6 | 346° F. | 390° F. | 58.48 |
| 7 | 361° F. | 413° F. | 52.83 |
| 8 | 369° F. | 426° F. | 48.30 |
| 9 | 375° F. | 431° F. | 42.56 |
| 10 | 378° F. | 434° F. | 42.44 |
| 11 | 381° F. | 437° F. | 39.11 |
| Test 2 | | | |
| 1 | 374° F. | 432° F. | 40.58 |
| 2 | 379° F. | 436° F. | 40.01 |
| 3 | 380° F. | 437° F. | 36.46 |
| 4 | 384° F. | 440° F. | 35.05 |
| 5 | 385° F. | 442° F. | 38.52 |
| 6 | 388° F. | 443° F. | 36.80 |
| 7 | 391° F. | 445° F. | 35.03 |
| 8 | 395° F. | 448° F. | 35.06 |

Tests 1 and 2 of Table II through multiple examples illustrate the capacity of the process for controlling flavor, i.e., color, even though certain of the variables are changed during processing. Color L was established by comparison to Hunter Lab color standard #LS-12695 dated May 1989. In Test 1 the lighter samples (samples 1-11) were prepared with a fluid level in the flash tank at about 2" from the bottom of the tank. In Test 2, samples 1-8, were prepared with a fluid level of about 1" below the incoming ramp or approximately near-filled condition. As stated previously, dwell time dramatically impacts color and flavor. The longer the dwell time the more color is imparted to the product. The use of low fluid level in the flash tank while producing the lighter color samples was for the purpose of reducing the amount of color potential in the product caused by dwell time.

Figure 2:
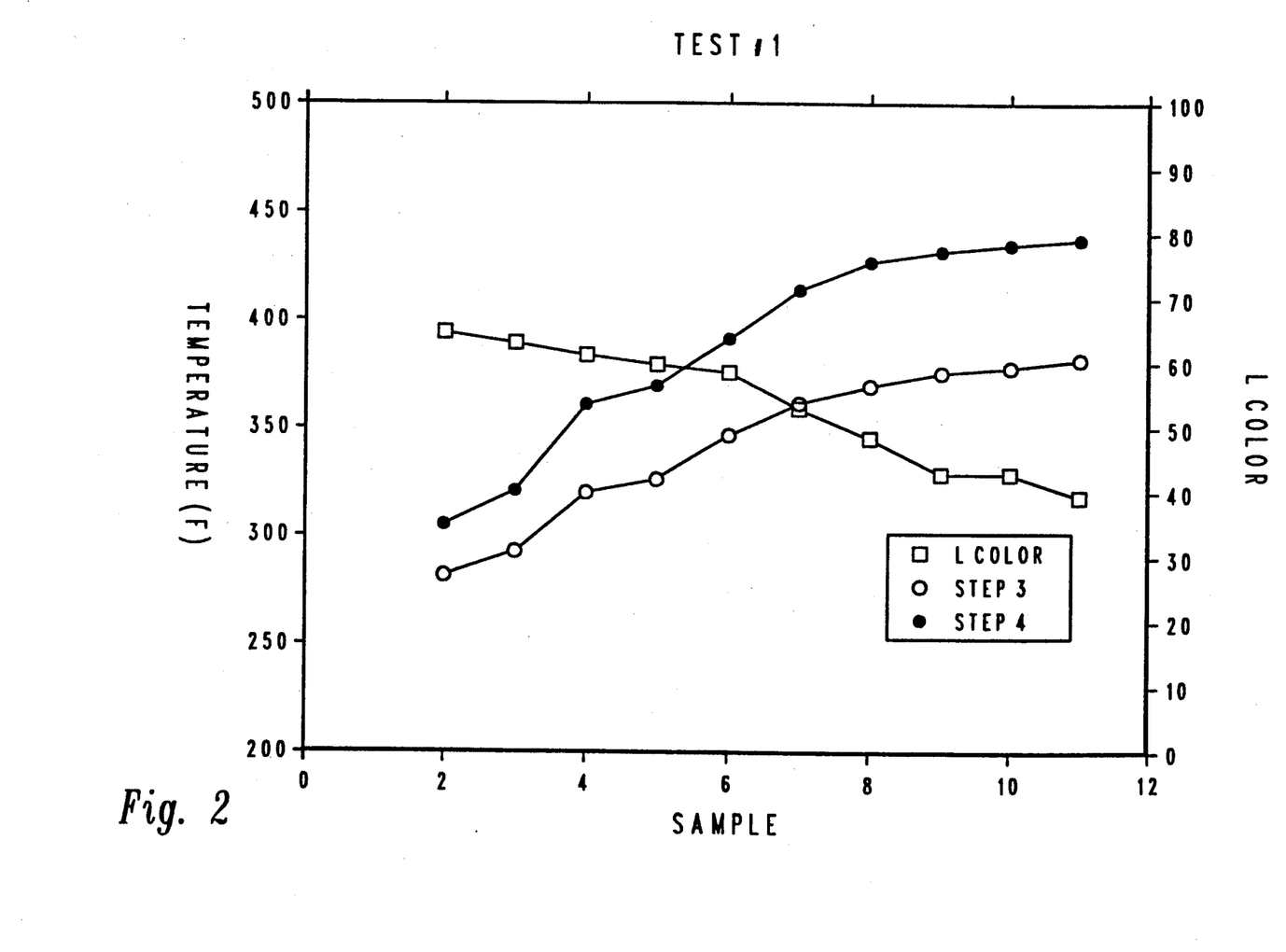
FIG. 2 is a graphic presentation of the data of Table II of Test 1 wherein the multiple samples are presented indicating the L color and temperature at steps 3 and 4.

FIG. 2 illustrates the data of Test 1 and Test 2 as found in Table II. The square data point graph line is an illustration of L color while the solid circle dot graph line is an illustration of the L color versus temperature for the respective samples from step 4; and the graph line indicated by circle data points is an illustration of the L color of the product versus temperature of the various samples after step 3. FIG. 2 clearly illustrates the impact of temperature on the L color (both step 3 and step 4) and the lower sample numbers were at relatively low temperatures and thus had light color versus the higher sample numbers (step 3 and step 4) were at elevated temperatures and produced a darker color.

Figure 3:
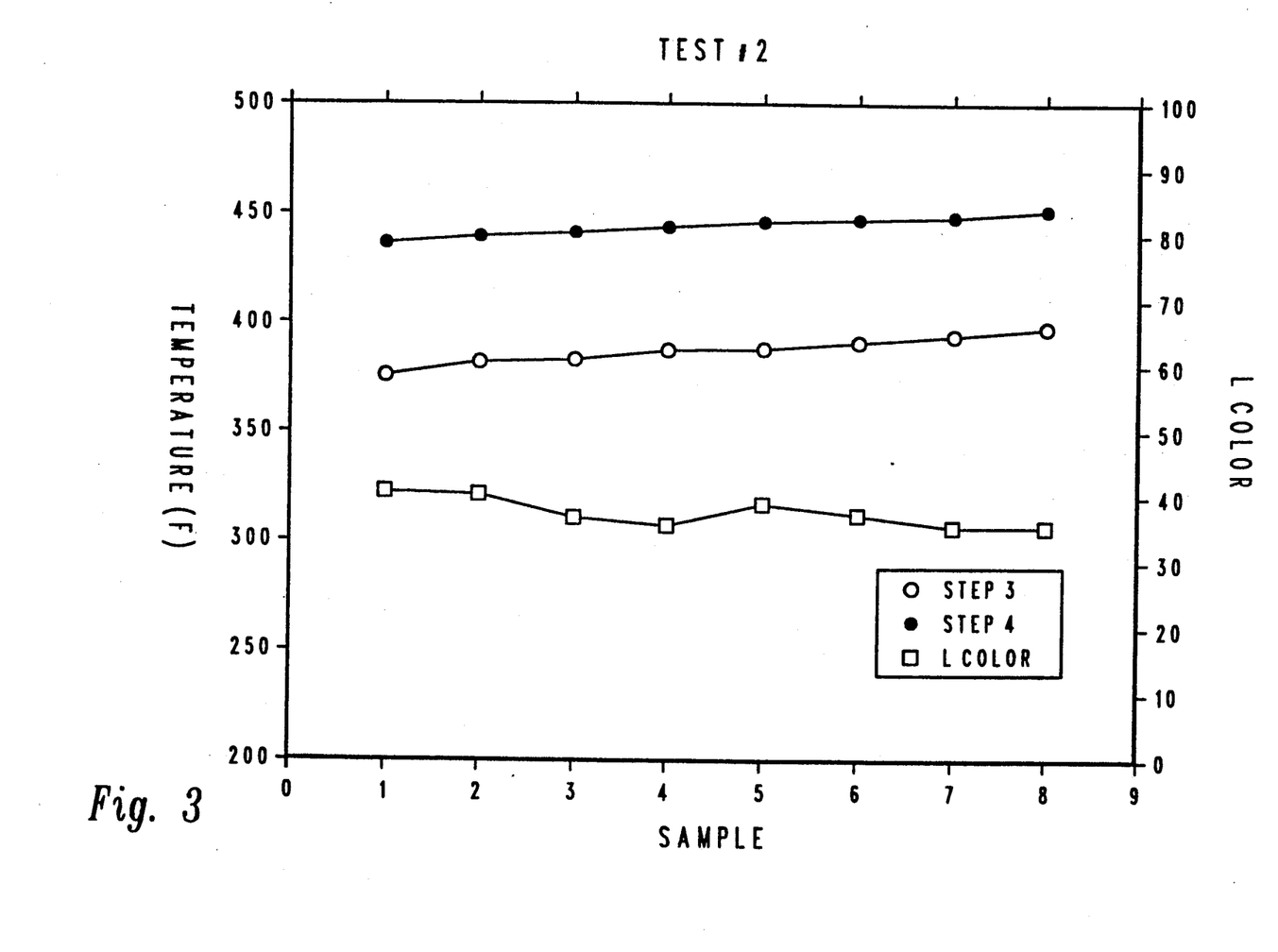
FIG. 3 is a graphic presentation of the data and samples of Test 2 of Table II, again illustrating L color for steps 3 and 4.

In Test 2 the only equipment variable was the flow rate. In order to achieve darker samples the flow rate was lowered and samples were taken at 10 minute intervals. In Test 1, two variables were encompassed, those variables being flow rate and process temperatures. Adjustment of these two variables is for illustrating production conditions found in normal cooking processing, i.e., the holding of the temperature of the product in the kettle at for example, 280° F. can create a product as it sits in the kettle of a darker color due to temperature. During production, adjustments are made in the other variables to compensate for color achieved in the kettle. For Test 1 and Test 2 attempts were made to hold the kettle temperature at about 230° to 240° F. in order to avoid substantial product color enhancement flowing from the kettle. FIG. 3 illustrates the data of Test 2 as found in Table 2. In Test 2 the process temperatures of steps 3 and 4 were maintained somewhat constant with higher temperatures at the higher sample numbers. Color L increases as indicated by lower L values, as a result of lowered flow rate that increases dwell time in step 3.

Constant color monitoring of the product output of the cooking SSHE or other production points along the process can be utilized in controlling product color, temperature, flow rate and dwell time in the flash tank by feeding such monitoring information into a process computer which will automatically adjust all of the aforementioned variables.

The terms and expressions which have been employed are used as terms of description and not of limitation, and it is not intended in the use of such terms and expressions to exclude an equivalence of the features shown and described or portions thereof, since it is recognized that various modifications are possible within the scope of the invention claimed.

What is claimed is:

1. A process for producing a roux base having a definitive flavor which is adjustable in intensity and definition through a combination of controlled heating, dwell time during heating and quenching comprising:

admixing flour with a liquified shortening, the mixture having a ratio from about 75:25 to about 25:75 percentage by weight of flour to shortening;

heating the mixture at a temperature for sufficient time to reduce the moisture content of the mixture to less than about 1% by weight;

continuously mixing and stirring the mixture while elevating the mixture temperature through various stages of caramelization and corresponding colors with the process and color change occurring at a more rapid rate as the temperature of the mixture increases;

flowing the caramelized mixture across a flat surface and exposing the flowing mixture to air flow which allows for efficient flashing or removal of remaining moisture and off-flavor components; and quenching the caramelized mixture upon reaching a predetermined color in a color range wherein L ranges from about 20 to about 75; a ranges from about 5 to about 10; and b ranges from about 6 to about 20, the quenching being achieved immediately upon reaching a desired color in order to halt the caramelization reaction which results in fixing a definitive flavored roux base.

2. The process according to claim 1 wherein the mixture of flour and liquified shortening is preheated at temperatures from about 150° to about 250° F. for sufficient time to reduce the moisture content of the mixture to less than about 1% by weight.

3. The process according to claim 1 wherein the flashing removal of moisture and off-flavor contaminants is achieved by flowing the product across a flat surface under vacuum.

4. The process according to claim 1 wherein the process is continuous and the mixture is maintained in a flowable condition by maintaining a temperature above the crystallization temperature of the shortening until the mixture is quenched.

5. The process according to claim 1 wherein a second caramelization occurs after flashing and before quenching.

6. The process according to claim 1 wherein the caramelized and flashed mixture at a predetermined color is cooled by pumping the mixture into a suitable heat transfer zone for reduction of the temperature from between about 100° to about 150° F. in less than about 2 minutes, the cooling temperature being maintained above the crystallization point of the shortening to insure suitable flow through the heat transfer zone and into the quenching zone.

7. The process according to claim 1 wherein the predried mixture is caramelized by elevating the temperature of the mixture while continuously mixing and scraping structure walls by elevating the mixture temperature in about two to twenty minutes to a temperature from about 300° F. to about 550° F. until a specific color is achieved followed by flashing in order to remove moisture and flavor contaminants and immediately quenching in order to halt the caramelization at a specific color and definitive flavor.

8. The process according to claim 1 wherein the shortening is either animal or vegetable or a mixture of both and has a melt point from about 70° F.

9. The process according to claim 8 wherein the shortening is a vegetable shortening.

10. The process according to claim 1 wherein the flour is selected from flours derived from the group consisting of wheat, corn, potato, rice and vegetable starch protein mixtures.

11. The process according to claim 1 wherein the caramelized and flashed mixture is quenched by introduction to a chill roller.

12. The process according to claim 1 wherein quenching is achieved by dropping the mixture temperature approximately 350° to 400° F. within about two to ten minutes to halt caramelization, said quenching leaving the mixture in a pumpable and flowable condition for removing said mixture to a cooling zone that drops the temperature of the mixture below the melt point of the shortening.

13. The process according to claim 1 wherein the caramelization color of the mixture is constantly monitored during the caramelization process with such monitoring data being fed to a process computer which automatically adjusts flow rates and temperatures of the process.

14. A batch process for producing a roux base having a definitive flavor which adjusts the flavor intensity through a combination of heating, timing and quenching comprising:

heating a mixture of flour with liquified shortening, the mixture having a ratio from about 75:25 to about 25:75 percentage by weight of flour to shortening;

the heating being maintained at temperatures of up to about 250° F. during mixing for sufficient time to reduce the moisture content to less than about 1% by weight;

elevating the temperature of the mixture while continuously mixing two caramelization temperatures from about 300° to about 550° F. for a period of time sufficient to reach a predetermined specific color, the batch caramelization process being exposed to vacuum or surface air flow sweep in order to remove additional moisture and flavor contaminants which are volatile at the caramelization temperatures; and immediately quenching the caramelized mixture upon reaching a predetermined color and specific definitive flavor.

15. The process according to claim 14 wherein the shortening is either animal or vegetable or a mixture of both and has a melt point from about 70° F. and the flour is selected from flours derived from the group consisting of wheat, corn, potato, rice and vegetable starch protein mixtures.

16. The process according to claim 14 wherein quenching drops the caramelized mixture temperature to a temperature ranging from above about 200° F. down to a temperature sufficiently low enough to stop caramelization reaction.

17. A process for producing a roux base having a definitive flavor which adjusts the flavor intensity through a combination of controlled heating, dwell time during heating and quenching comprising:

admixing flour with a liquified shortening at a temperature from about 150° to about 250° F., maintaining the mixture at the temperature for sufficient time to reduce the moisture content of the mixture to less than about 1% by weight, the mixture having a ratio from about 75:25 to about 25:75 percentage by weight of flour to shortening;

flowing the mixture into a scrap surface heat exchanger;

heating the continuously flowing mixture in the scrap surface heat exchanger at a temperature from about 300° to about 550° F. for sufficient dwell time to reach a predetermined caramelization level;

flowing the heated and caramelized mixture across a flat surface which is exposed to atmospheric pressure and sweep gases for removing moisture and volatile contaminants;

allowing the stripped mixture to accumulate in an insulated, agitated container where caramelization continues until the desired color is obtained;

pumping the caramelized mixture upon reaching a predetermined color to a suitable mixing and heat exchange zone wherein the mixture temperature is reduced to about 100° to 150° F. in less than about two to ten minutes, the cooling temperature being maintained above the crystallization point of the shortening to allow for suitable flow conditions for removing the cooled mixture to a final chilling zone which reduces the mixture temperature to below the melt point of the shortening; and removing the resulting roux base having a definitive flavor.

18. The process according to claim 17 wherein the roux base having a definitive flavor is directly dependent upon a specific color which is achieved during caramelization, upon reaching a predetermined color in a color range wherein L color ranges from about a 30 to about 70.

19. The process according to claim 18 wherein the L color ranges from about 30 to about 50.

20. The process according to claim 17 wherein the shortening is either animal or vegetable or a mixture of both and has a melt point from about 70° F.

21. The process according to claim 17 wherein the flour is selected from flours derived from the groups consisting of wheat, corn, potato, rice and vegetable starch protein mixtures.

22. The process according to claim 17 wherein the flour is comprised from about 2% to about 25% total protein.

23. The process according to claim 17 wherein antioxidant and multipliers are added after flavor development but prior to quenching.

24. The process according to claim 17 wherein the flour is comprised of an allpurpose enriched bleached wheat flour blend and the shortening is comprised of a partially partially hydrogenated soy bean oil having a melting point of about 112° F. or greater.

25. A roux base having a definitive flavor,
the roux base comprised of a caramelized flour and shortening mixture having a ratio from about 75:25 to about 25:75 percent by weight of flour to shortening;
the roux base exhibiting a L color in the range of from about 30 to about 70 as a result of heating, mixing, caramelizing and quenching of the mixture; and
the color being correlatable to the definitive flavor.

26. The roux base according to claim 25 wherein the L color range is from about 30 to about 50.

27. A caramelized roux base having a definitive flavor,
the caramelized roux base comprised of a bleached flour having less than about 1% moisture and a partially hydrogenated soy bean oil having a melting point of about 112° F. or weight of flour to sot bean oil; greater; greater;
the flour and the oil being present in a ratio from about 75:25 to about 25:75 percent by weight of flour to soy bean oil;
the roux base exhibiting a L color in the range of from about 30 to about 70 as a result of heating, mixing, caramelizing and quenching; and
the color being correlatable to the definitive flavor.

28. A process for producing an edible roux having a definitive flavor which is used in combination with other food products wherein the roux according to claim 25 is added to water at from about 100° F. to about 212° F. with mixing.

* * * * *